US012702601B2

(12) United States Patent
Stranko et al.

(10) Patent No.: US 12,702,601 B2
(45) Date of Patent: Aug. 11, 2026

(54) IN-FLOOR RAMP ASSEMBLY WITH OVERHEAD RAIL, LATERAL GUIDES, AND ENERGY ABSORBING END STOPS

(71) Applicant: The Braun Corporation, Winamac, IN (US)

(72) Inventors: Scott Stranko, Noblesville, IN (US); Robert Earl Bettcher, III, Winamac, IN (US); Justin Hargraves, Kokomo, IN (US)

(73) Assignee: The Braun Corporation, Winamac, IN (US)

( * ) Notice: Subject to any disclaimer, the term of this patent is extended or adjusted under 35 U.S.C. 154(b) by 476 days.

(21) Appl. No.: 18/450,599

(22) Filed: Aug. 16, 2023

(65) Prior Publication Data

US 2024/0058187 A1 Feb. 22, 2024

Related U.S. Application Data

(60) Provisional application No. 63/519,776, filed on Aug. 15, 2023, provisional application No. 63/398,651, filed on Aug. 17, 2022.

(51) Int. Cl.
*A61G 3/06* (2006.01)

(52) U.S. Cl.
CPC .................................... *A61G 3/061* (2013.01)

(58) Field of Classification Search
CPC .......... A61G 3/061; A61G 3/067; B60P 1/431
(Continued)

(56) References Cited

U.S. PATENT DOCUMENTS 4,131,209 A * 12/1978 Manning ................... B60R 3/02
105/433
5,832,555 A * 11/1998 Saucier ................... B60P 1/431
14/71.1

(Continued)

FOREIGN PATENT DOCUMENTS

WO WO-2008130229 A1 * 10/2008 ............. A61G 3/067

OTHER PUBLICATIONS

International Search Report and Written Opinion of the International Searching Authority for PCT/US2023/072263, Nov. 27, 2023, 11 pages, International Searching Authority for the European Patent Office.

*Primary Examiner* — Gary S Hartmann
(74) *Attorney, Agent, or Firm* — Daniel Tallitsch; Tyler Schultz

(57) ABSTRACT

A ramp assembly includes a guide rail at least partially disposed in a void space between ramp platform edge guards, above a ramp platform, and below a ramp cover to reduce the overall height/thickness of the ramp assembly as compared to prior art ramp assemblies that locate guide rails below the ramp platform. A transition flap assembly provides lateral guidance for the ramp platform and carriage assembly. The transition flap assembly and ramp platform assembly engage to ensure at least approximate contact between the transition flap and ramp platform when the ramp platform is deployed and to maintain a spaced relationship between the two when the ramp platform is between the deployed and stowed positions. A sliding door track is configured to provide structural reinforcement to a track pan area of a floor. The guide rail may include an enhanced end stop to decelerate the ramp platform over a distance.

20 Claims, 13 Drawing Sheets

(58) Field of Classification Search
USPC .......................................................... 414/921
See application file for complete search history.

(56) References Cited

U.S. PATENT DOCUMENTS

| | | | | |
|---|---|---|---|---|
| 6,484,344 | B1 * | 11/2002 | Cooper .................. | A61G 3/061<br>14/71.1 |
| 8,926,254 | B2 * | 1/2015 | Pocobello ............. | B62D 31/00<br>414/921 |
| 9,333,129 | B2 * | 5/2016 | Cardona ............... | B60P 7/0823 |
| 10,806,648 | B2 * | 10/2020 | Perkins ................... | B60P 1/431 |
| 2021/0361499 | A1 | 11/2021 | Oller et al. | |

* cited by examiner

IN-FLOOR RAMP ASSEMBLY WITH OVERHEAD RAIL, LATERAL GUIDES, AND ENERGY ABSORBING END STOPS

CROSS REFERENCE TO OTHER APPLICATIONS

This application claims priority to U.S. Provisional Patent Application No. 63/398,651, filed on Aug. 17, 2022, and U.S. Provisional Patent Application No. 63/519,776, filed on Aug. 15, 2023, the contents of which are incorporated herein by reference. PCT Application No. PCT/US23/72263, filed on Aug. 16, 2023, is also incorporated herein by reference.

FIELD OF THE DISCLOSURE

The present disclosure relates to a passenger vehicle for transporting one or more passengers, and more particularly to a ramp assembly for accommodating ingress and egress of a physically limited passenger, where the ramp assembly includes an overhead rail and/or a lateral guide for a ramp platform assembly and/or a carriage assembly.

BACKGROUND

Automobile manufacturers do not currently mass-produce passenger vehicles specifically designed to transport passengers having physical limitations, either as a driver or a passenger. Consequently, mass-produced passenger vehicles are modified, or retrofitted, by aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van may be retrofitted with a ramp to enable a physically limited individual using a wheelchair to enter the vehicle without the assistance of another individual. Once inside the vehicle, such individuals may operate the vehicle as a vehicle operator or occupy locations designated for passengers. This may include, but is not limited to, a front passenger location or mid and rear passenger locations.

In some vehicles, which are considered viable candidates for retrofitting, the construction of the vehicle requires significant modification to accommodate the addition of a ramp. For example, in one or more modifications of a minivan, at least a portion of the OEM floor will be removed and replaced with a new, lower floor (sometimes referred to as a floor weldment or floor structure). An above-floor ramp may be installed on top of the new floor surface of the floor weldment, or the floor weldment may include a recessed area for receiving an in-floor ramp whereby the top cover of the in-floor ramp will be approximately flush with the new floor surface of the floor weldment. In either case, the vehicle body must be raised to maintain adequate ground clearance. In-floor ramps allow for unimpeded ambulatory access to the vehicle with the ramp in a stowed position but usually require a greater vehicle body raise than is required by ramps of other types, such as folding, above-floor ramps.

The present inventions aim to solve the problems of the prior art ramps by packaging an in-floor ramp more efficiently, such that the body raise on the vehicle can be reduced or minimized. Much of the prior art includes guide rails mounted underneath the ramp platform, which has been found to increase the thickness of the ramp assembly. In one embodiment described herein, body raise can be reduced by instead locating the guide rails(s) above the ramp platform assembly, whereby the guide rail(s) occupy an existing void space between ramp platform edge guards. The space previously occupied by the guide rail underneath the ramp platform can be eliminated, which reduces the overall height/thickness of the ramp assembly. An additional benefit of mounting the guide rail above the ramp platform assembly is that the ramp platform assembly can be located lower in the vehicle, closer to the ground level, resulting in a lower ramp angle when deployed. Other embodiments include lateral guide members that keep the various components in alignment, both laterally and vertically. For the avoidance of doubt, the embodiments and features described herein have utility and are contemplated in combination and in isolation.

SUMMARY OF THE EMBODIMENTS

In one embodiment of the present disclosure, a ramp assembly includes a guide rail configured to guide a ramp platform assembly between a stowed position and a deployed position. The ramp platform assembly includes a ramp platform, a first edge guard approximate a first lateral extremity of the ramp platform assembly, and a second edge guard approximate a second lateral extremity of the ramp platform assembly. At least a portion of the guide rail is disposed above the ramp platform.

In one example of this embodiment, the ramp assembly includes a ramp cover, wherein the guide rail is disposed below the ramp cover. In another example, the guide rail is disposed between the first edge guard and the second edge guard. In another example, at least a portion of the guide rail is disposed below a top edge of the first edge guard and a top edge of the second edge guard.

In another example, the first edge guard and the second edge guard extend upwardly from the ramp platform at least when the ramp platform assembly is in its deployed position. The first edge guard and the second edge guard may extend upwardly from the ramp platform when the ramp platform assembly is in its stowed position.

In another example, the guide rail is fixed to an underside of the ramp cover.

In another example, the guide rail consists essentially of a single centrally disposed rail.

In another example, the ramp platform assembly is hingedly connected to a carriage assembly whereby the ramp platform assembly can pivot downwardly from the carriage assembly in the deployed position. Further, the carriage assembly engages with the guide rail to move the ramp platform assembly between its stowed position and deployed position.

In another example, the guide rail comprises a C-shape with a pair of inwardly directed lips that define a channel. Further, the carriage assembly includes at least one roller wheel configured to move longitudinally in the channel.

In another example, the ramp assembly includes a transition flap assembly that at least partially overlies the carriage assembly at least when the ramp platform assembly is in the deployed position. Further, the transition flap assembly engages with the carriage assembly as the ramp platform assembly approaches the deployed position to keep the carriage assembly approximately aligned with the guide rail.

In another example, the ramp assembly includes a transition flap assembly that overlies the ramp platform assembly at least when the ramp platform assembly is disposed in a plurality of transitional positions between the stowed position and the deployed position. Further, the transition flap assembly includes a first guide member configured to engage the first edge guard and a second guide member configured to engage the second edge guard and thereby limit a lateral movement of the ramp platform assembly when the ramp platform assembly is in the transitional positions.

In another example, the ramp assembly includes a transition flap assembly overlying the ramp platform assembly at least when the ramp platform assembly is disposed in a plurality of transitional positions between the stowed position and the deployed position. Further, the transition flap is coupled to the ramp platform assembly via a cam mechanism to maintain a spaced relationship between the transition flap assembly and the ramp platform assembly when the ramp platform assembly is in the transitional positions. The cam mechanism may further be configured to move an outboard longitudinal extremity of the transition flap assembly into at least approximate contact with the ramp platform as the ramp platform assembly approaches the deployed position. The cam mechanism may further be configured to move the outboard longitudinal extremity of the transition flap assembly into at least approximate contact with the ramp platform as the ramp platform assembly approaches the stowed position.

In another embodiment of the present disclosure, a ramp assembly includes a ramp platform assembly having a ramp platform and a first edge guard extending upwardly from the ramp platform approximate a first lateral extremity of the ramp platform assembly. Further, the ramp platform assembly is moveable between a stowed position and a deployed position. Further yet, a transition flap assembly overlies the ramp platform assembly at least when the ramp platform assembly is disposed in a plurality of transitional positions between the stowed position and the deployed position. The transition flap assembly and the first edge guard are configured to engage and thereby limit a lateral movement of the ramp platform assembly in a first direction when the ramp platform assembly is in the transitional positions.

In one example of this embodiment, a second edge guard extends upwardly from the ramp platform approximate a second lateral extremity of the ramp platform assembly. Further, the transition flap assembly and the second edge guard are configured to engage and thereby limit a lateral movement of the ramp platform assembly in a second direction when the ramp platform assembly is in the transitional positions, the first direction being opposite the second direction.

In another example, the transition flap assembly includes a first roller wheel configured to engage an inside vertical surface of the first edge guard.

In another example, the transition flap assembly includes a first roller wheel configured to engage an inside vertical surface of the first edge guard and a second roller wheel configured to engage an inside vertical surface of the second edge guard.

In another example, the transition flap is coupled to the ramp platform assembly via a cam mechanism to maintain a spaced relationship between the transition flap assembly and the ramp platform assembly when the ramp platform assembly is in the transitional positions.

In another example, the cam mechanism is configured to move an outboard longitudinal extremity of the transition flap assembly into at least approximate contact with the ramp platform as the ramp platform assembly approaches the deployed position.

In another example, the cam mechanism is configured to move the outboard longitudinal extremity of the transition flap assembly into at least approximate contact with the ramp platform as the ramp platform assembly approaches the stowed position.

In another example, a guide rail is configured to guide the ramp platform assembly between the stowed position and the deployed position. At least a portion of the guide rail is disposed above the ramp platform. In another example, the guide rail is disposed below a ramp cover. In another example, the ramp platform assembly further comprises a second edge guard approximate a second lateral extremity of the ramp platform assembly. Further, the guide rail is disposed between the first edge guard and the second edge guard. In another example, at least a portion of the guide rail is disposed below a top edge of the first edge guard and a top edge of the second edge guard.

In another example, the first edge guard and the second edge guard extend upwardly from the ramp platform at least when the ramp platform assembly is in its deployed position. In another example, the first edge guard and the second edge guard extend upwardly from the ramp platform when the ramp platform assembly is in its stowed position.

In another example, the guide rail is fixed to an underside of the ramp cover.

In another example, the guide rail consists essentially of a single centrally disposed rail.

In another embodiment of the present disclosure, a ramp platform assembly is moveable between a stowed position where the ramp platform assembly is configured to be generally parallel with a floor of the passenger vehicle and a deployed position where the ramp platform assembly is configured to be at an angle relative to a floor of the passenger vehicle. Further, a transition flap assembly overlies the ramp platform assembly at least when the ramp platform assembly is disposed in a plurality of transitional positions between the stowed position and the deployed position. The transition flap is coupled to the ramp platform assembly via a cam mechanism to maintain a spaced relationship between an outboard longitudinal extremity of the transition flap assembly and the ramp platform assembly when the ramp platform assembly is in the transitional positions.

In another example, the ramp platform assembly comprises a ramp platform and a first edge guard extending upwardly from the ramp platform approximate a first lateral extremity of the ramp platform assembly. Further, the first edge guard defines a first cam surface for the cam mechanism. Further yet, the transition flap assembly defines a first cam follower for the cam mechanism that engages with the first cam surface.

In another example, when the ramp platform assembly is in the deployed position, the outboard longitudinal extremity of the transition flap assembly is disposed in at least approximate contact with the ramp platform. Further, the first cam surface includes a first cam profile at an inboard end of the first edge guard that guides the outboard longitudinal extremity of the transition flap assembly away from approximate contact with the ramp platform and to the spaced relationship as the ramp platform assembly moves away from the deployed position.

In another example, when the ramp platform assembly is in the stowed position, the outboard longitudinal extremity of the transition flap assembly is disposed in at least approximate contact with the ramp platform Further, the first cam surface includes a second cam profile at an outboard end of the first edge guard that guides the outboard longitudinal extremity of the transition flap assembly away from approximate contact with the ramp platform and to the spaced relationship as the ramp platform assembly moves away from the stowed position.

In another example, a second edge guard extends upwardly from the ramp platform approximate a second lateral extremity of the ramp platform assembly, the second edge guard being a mirror image of the first edge guard.

In another example, the ramp platform assembly is hingedly connected to a carriage assembly whereby the ramp platform assembly can pivot downwardly from the carriage assembly in the deployed position. Further, the carriage assembly engages with a guide rail to move the ramp platform assembly between its stowed position and deployed position. Further yet, the transition flap assembly at least partially overlies the carriage assembly at least when the ramp platform assembly is in the deployed position. The transition flap assembly engaging with the carriage assembly as the ramp platform assembly approaches the deployed position to keep the carriage assembly approximately aligned with the guide rail.

In another example, the transition flap assembly and the ramp platform assembly are configured to engage and thereby limit a lateral movement of the ramp platform assembly when the ramp platform assembly is in the transitional positions. In another example, the transition flap assembly includes a first roller wheel configured to engage an inside vertical surface of a first edge guard of the ramp platform assembly and a second roller wheel configured to engage an inside vertical surface of a second edge guard of the ramp platform assembly.

In another example, a guide rail is configured to guide the ramp platform assembly between the stowed position and the deployed position, wherein at least a portion of the guide rail is disposed above a ramp platform of the ramp platform assembly. In another example, the guide rail is disposed below a ramp cover. In another example, the ramp platform assembly comprises a first edge guard approximate a first lateral extremity of the ramp platform and a second edge guard approximate a second lateral extremity of the ramp platform. Further, the guide rail is disposed between the first edge guard and the second edge guard. In another example, at least a portion of the guide rail is disposed below a top edge of the first edge guard and a top edge of the second edge guard.

In another example, the first edge guard and the second edge guard extend upwardly from the ramp platform at least when the ramp platform assembly is in its deployed position. In another example, the first edge guard and the second edge guard extend upwardly from the ramp platform when the ramp platform assembly is in its stowed position.

In another example, the guide rail is fixed to an underside of the ramp cover.

In another example, the guide rail consists essentially of a single centrally disposed rail.

In another embodiment of the present disclosure a ramp platform assembly is hingedly connected to a carriage assembly. The carriage assembly guides the ramp platform assembly between a stowed position where the ramp platform assembly is configured to be generally parallel with a floor of the passenger vehicle and a deployed position where the ramp platform assembly is configured to be at an angle relative to a floor of the passenger vehicle. Further, a transition flap assembly overlies the carriage assembly at least when the ramp platform assembly is in the deployed position, wherein the transition flap assembly engages with the carriage assembly as the ramp platform assembly approaches the deployed position to keep the carriage assembly approximately aligned with the transition flap assembly in a lateral direction.

In another example, the carriage assembly engages with the guide rail to move the ramp platform assembly between its stowed position and deployed position. Further, the transition flap assembly engages with the carriage assembly as the ramp platform assembly approaches the deployed position to keep the carriage assembly approximately aligned with the guide rail in the lateral direction.

In another example, one of the carriage assembly and the transition flap assembly includes a guide flange and the other of the carriage assembly and the transition flap assembly includes at least one wear pad, wherein the guide flange and the wear pad engage to keep the carriage assembly approximately aligned. In another example, the at least one wear pad comprises a first wear pad aligned at a converging angle to a second wear pad.

In another example, the transition flap assembly overlies the ramp platform assembly at least when the ramp platform assembly is disposed in a plurality of transitional positions between the stowed position and the deployed position. Further, the transition flap assembly and the ramp platform assembly are configured to engage to keep the ramp platform assembly approximately aligned with the transition flap assembly in the lateral direction.

In another example, the transition flap assembly overlies the ramp platform assembly at least when the ramp platform assembly is disposed in a plurality of transitional positions between the stowed position and the deployed position. Further, the transition flap assembly and the ramp platform assembly engage to maintain a spaced relationship between an outboard longitudinal extremity of the transition flap assembly and a ramp platform of the ramp platform assembly when the ramp platform assembly is in the transitional positions. In another example, an outboard longitudinal extremity of the transitional flap assembly is disposed in at least approximate contact with the ramp platform when the ramp platform assembly is in the deployed position. In another example, the outboard longitudinal extremity of the transitional flap assembly is disposed in at least approximate contact with the ramp platform when the ramp platform assembly is in the stowed position.

In another example, a guide rail is configured to guide the ramp platform assembly between the stowed position and the deployed position. Further, at least a portion of the guide rail is disposed above a ramp platform of the ramp platform assembly. In another example, the guide rail is disposed below a ramp cover. In another example, the ramp platform assembly comprises a first edge guard approximate a first lateral extremity of the ramp platform and a second edge guard approximate a second lateral extremity of the ramp platform. Further, the guide rail is disposed between the first edge guard and the second edge guard. In another example, at least a portion of the guide rail is disposed below a top edge of the first edge guard and a top edge of the second edge guard.

In another example, the first edge guard and the second edge guard extend upwardly from the ramp platform at least when the ramp platform assembly is in its deployed position. In another example, the first edge guard and the second edge guard extend upwardly from the ramp platform when the ramp platform assembly is in its stowed position.

In another example, the guide rail is fixed to an underside of the ramp cover.

In one example of any of the previous embodiments, the ramp assembly is installed in a recessed area of a floor weldment for the passenger vehicle. In another example, a roller bracket is secured in a track pan area of the floor weldment, the track pan area being disposed adjacent to and below the recessed area. Further, the roller bracket includes at least one roller for supporting an underside of the ramp platform assembly in at least one of the stowed, transitional, and deployed positions. In another example, a sliding door track is secured in the track pan area of the floor weldment, the track pan area disposed adjacent to and below the recessed area. In another example, the sliding door track is secured to and extends generally vertically from a bottom surface of the track pan area. Further, at least one bracket is secured to and extends between a top of the sliding door track and a side wall of the track pan area. In another example, the ramp platform assembly includes at least one support roller being configured to engage with the top surface of the at least one bracket when the ramp platform assembly is in the deployed position.

In another embodiment of the present disclosure, a ramp assembly is provided to accommodate a wheelchaired passenger to enter or exit a passenger vehicle. The ramp assembly includes a ramp platform assembly moveable between a stowed position and a deployed position. At least one non-rigid end stop is configured to engage a portion of the ramp assembly and decelerate the ramp platform assembly over a distance as it approaches at least one of the stowed position and the deployed position.

In one example, a guide rail is configured to guide the ramp platform assembly between the stowed position and the deployed position.

In another example, the at least one non-rigid end stop is disposed at least one end of the guide rail.

In another example, the at least one non-rigid end stop is configured to decelerate the ramp platform assembly as it approaches the stowed position.

In another example, a carriage assembly is provided. The carriage assembly has at least one roller configured to traverse a length of the guide rail, wherein the at least one roller is the portion of the ramp assembly that engages the at least one non-rigid end stop.

In another example, the at least one non-rigid end stop comprises a bumper.

In another example, the bumper is comprised of a viscoelastic material.

In another example, the at least one non-rigid end stop comprises at least one energy absorbing member.

In another example, the at least one energy absorbing member comprises at least one of a coil spring, a viscoelastic spring, a viscoelastic bumper, and a dashpot.

In another example, the at least one energy absorbing member comprises a coil spring.

In another example, the at least one energy absorbing member comprises a viscoelastic spring.

In another example, the at least one energy absorbing member comprises a viscoelastic bumper.

In another example, the at least one energy absorbing member comprises a dashpot.

In another example, the at least one non-rigid end stop further comprises a sliding member, wherein the at least one energy absorbing member is disposed between the sliding member and a fixed member, and wherein the sliding member engages the portion of the ramp assembly to decelerate the ramp platform assembly.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
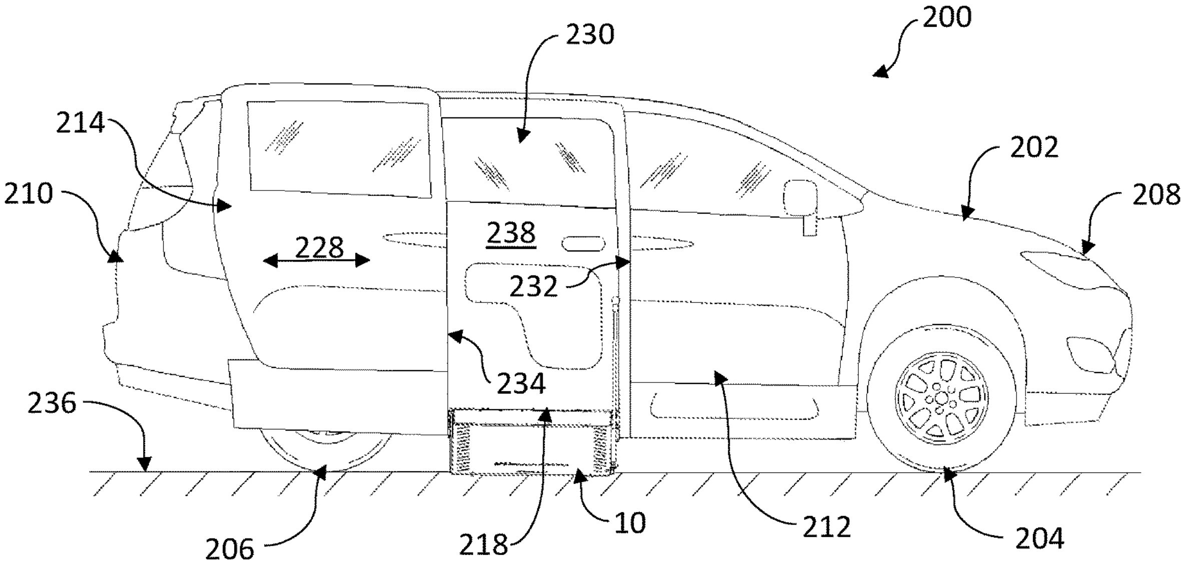
FIG. 1 is a side view of a motorized vehicle.

FIG. 1 illustrates an embodiment of a powered vehicle 200 available from any number of United States and foreign manufacturers. In the illustrated embodiment, the vehicle 200 may comprise a unibody construction. However, other vehicles contemplated within this disclosure may include a frame on body construction. Consequently, the use of the powered vehicle 200 herein includes all types and kinds of vehicles constructed with a body on frame construction, a unibody construction, or other constructions.

As shown in FIG. 1, the vehicle 200 may include a vehicle body or chassis 202 operatively coupled to front wheels 204 and rear wheels 206 which support the vehicle 200 as it traverses the ground. The front wheels 204 may define a front axle and the rear wheels 206 may define a rear axle of the vehicle 200.

As shown, the vehicle 200 includes a front end 208 and a rear end 210. A conventional driver's seat and front passenger seat (not shown) are generally located towards the front end 208 of the vehicle 200, whereas a rear passenger seat (not shown) is generally located towards the rear end 210 of the vehicle. More specifically, the vehicle 200 may include an interior that comprises a front interior portion and a rear interior portion. In several embodiments, the driver's seat and front passenger seat may be located in the front interior portion, and at least one rear passenger seat or at least one row of seats, usually two rows, may be located in the rear interior portion of the vehicle 200.

In some embodiments, the vehicle 200 may include a first or front passenger side door 212 located between the front wheels 204 and rear wheels 206 and providing access to a passenger for sitting in a front passenger seat (not shown) of the vehicle 200 adjacent to the driver. In this position, the passenger has a clear forward view of the road when compared to sitting in the rear passenger seat of the vehicle 200. Moreover, when seated, the passenger may be facing in a forward direction of travel. Further, in the illustrated embodiment of FIG. 1, the vehicle 200 may include a second or rear passenger side door 214 coupled to the unibody frame 202.

In some embodiments, the first door 212 and second door 214 may be hingedly coupled to the frame 202 of the vehicle 200. In other embodiments, at least the second door 214 may be slidably coupled to the frame 202. In FIG. 1, the second door 214 is capable of being moved along a direction indicated by arrow 228 between an open position and a closed position. A user may grasp and manipulate a door handle to manually move the door 214 between the open and closed positions. In further embodiments, a key fob or other electrical control device (not shown) may send an electrical signal to a controller for moving the door 214 between its open and closed positions.

Figure 14:
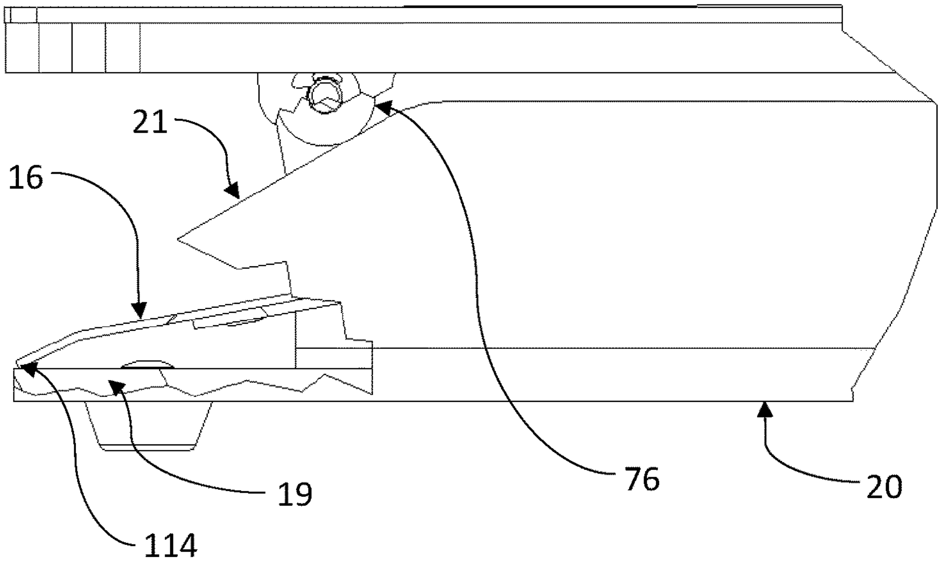
FIG. 14 is a cutaway side view of the ramp assembly 10 in the stowed state. This figure shows the relative positions of the transition flap assembly 16 and transition flap support roller 76 in the stowed state.
Figure 15:
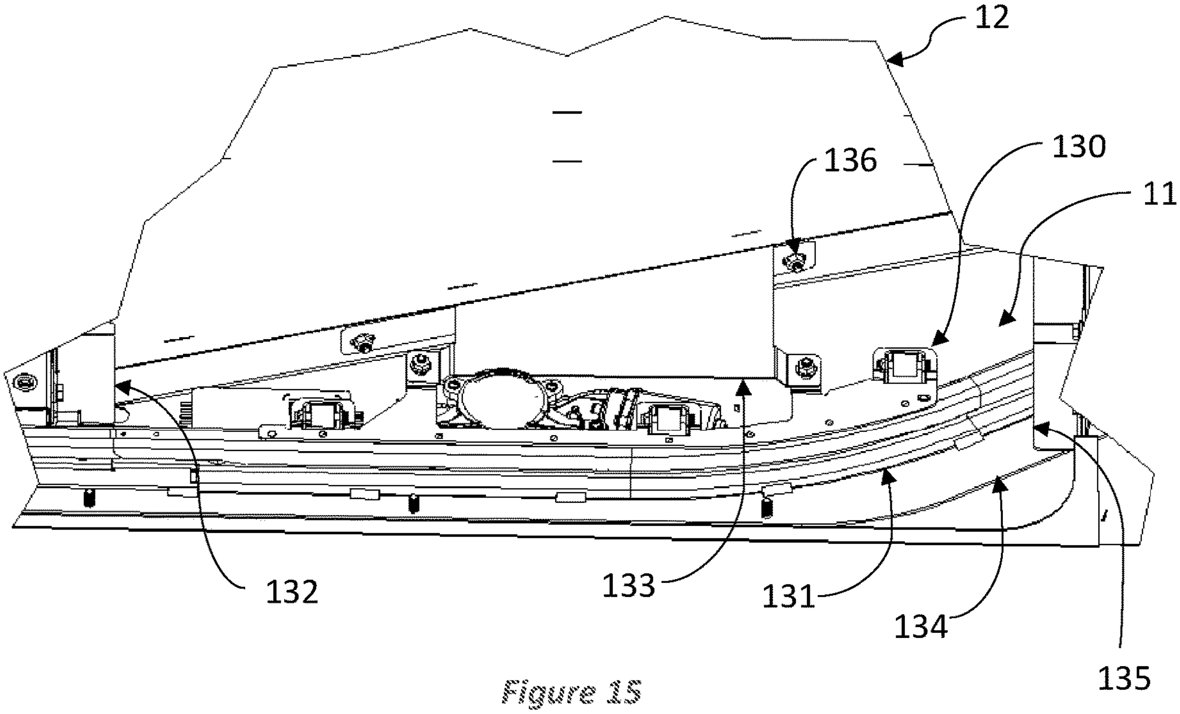
FIG. 15 is a detail perspective view of the vehicle floor weldment 12, the sliding door track 131, and roller bracket assembly 130, and their attachment to each other.
Figure 16:
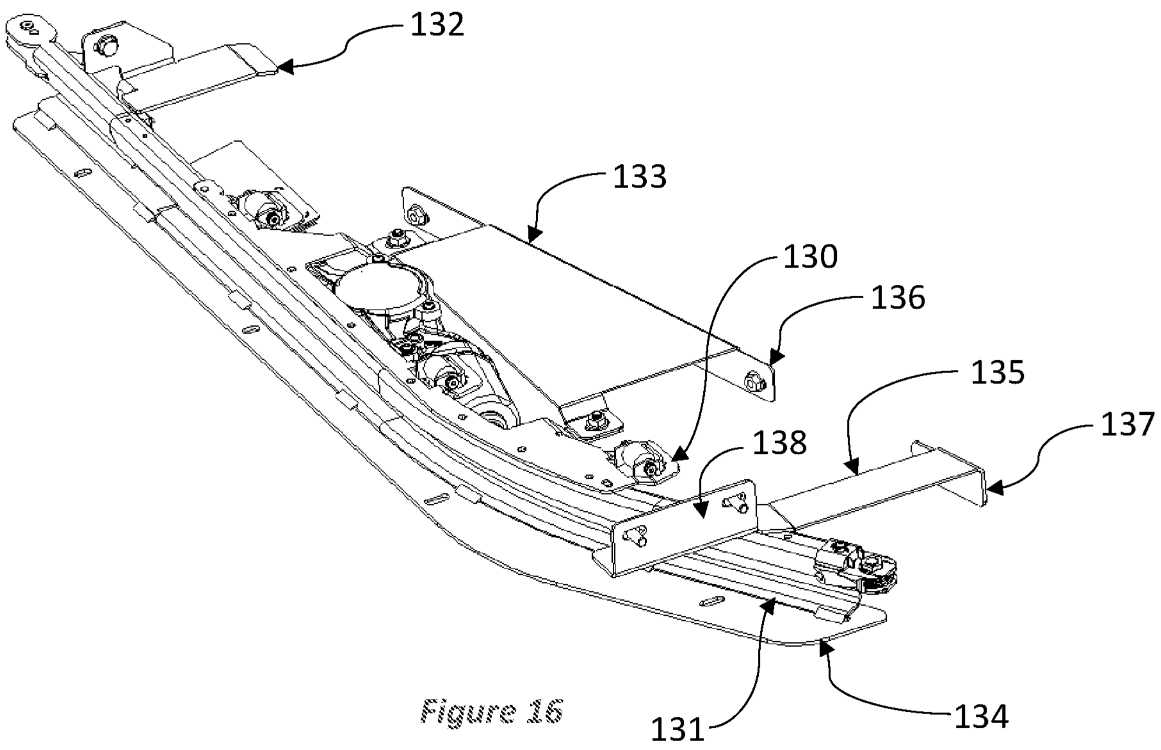
FIG. 16 is a perspective view of the sliding door track 131 and roller bracket assembly 130 in isolation.

In one embodiment, the second door 214 of the vehicle in FIG. 1 is slidably coupled to the frame 202 of the vehicle 200. The frame 202 may include one or more tracks upon which the door 214 is in a sliding engagement with as it moves between the open and closed positions. For example, as described in more detail below in connection with FIGS. 14, 16, and 18, the vehicle frame 202 may include at least track 131 located adjacent a lower edge of the door 214. The track 131 may be located in a recessed area of the floor weldment 12 typically referred to as the track pan area 11, which is recessed further than the ramp cavity area 13. As shown, the track pan area 11 may be triangular in shape (when viewed from above), but the shape of the track pan area 11 varies from vehicle to vehicle. In other embodiments, the vehicle frame 202 may include additional tracks, including a track (not shown) adjacent an upper edge of the door 214, or in the middle of the door. As the door 214 is moved to the open position, an opening 230 is created to provide access to the interior of the vehicle 200. The opening may be defined on the sides thereof by an edge 232 of a B-pillar and the edge 234 of the door 214 (or alternatively an edge of a C-pillar, hidden behind door 214).

Figure 2:
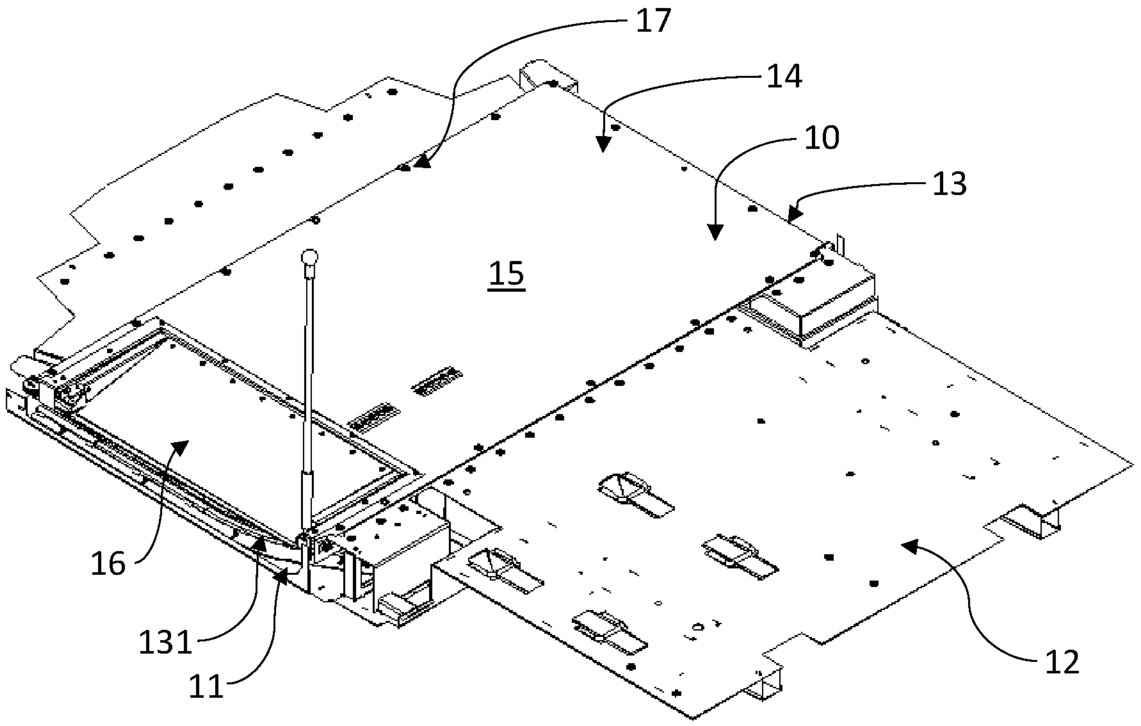
FIG. 2 is a perspective view of an in-floor ramp assembly 10 in its stowed state including: the vehicle floor weldment 12, ramp cover assembly 14 and transition flap assembly 16.
Figure 3:
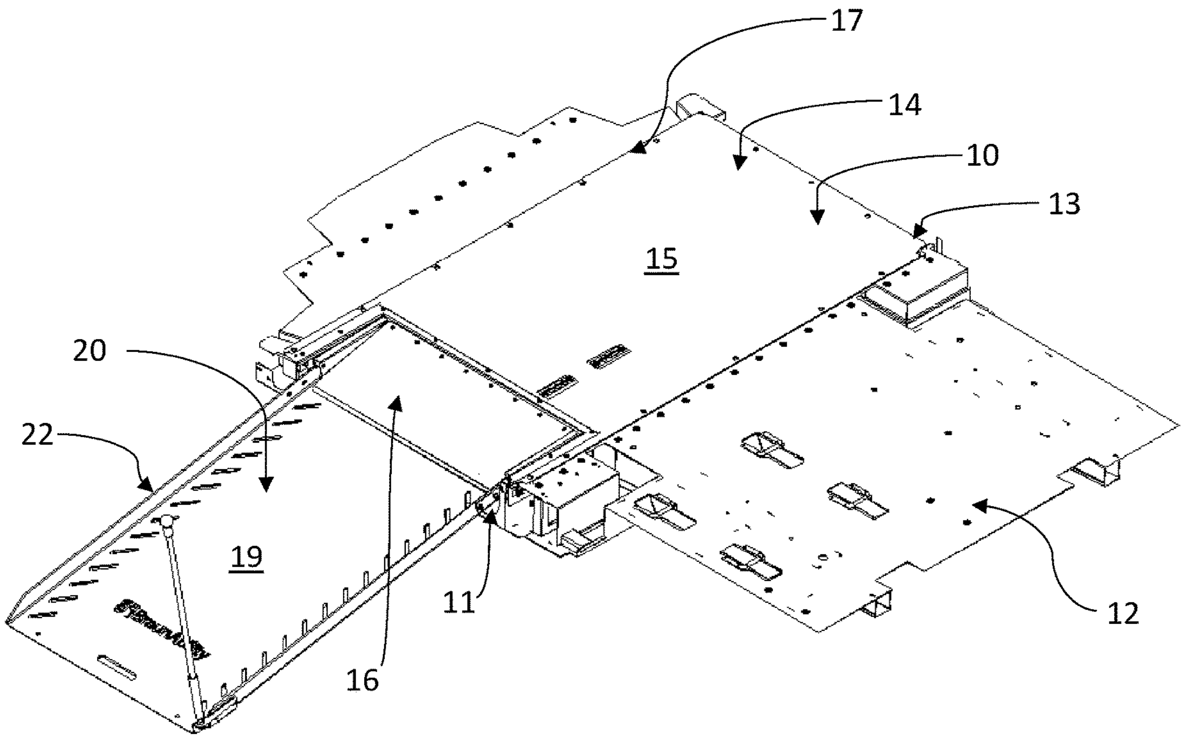
FIG. 3 is a perspective view of the in-floor ramp assembly 10 in its fully deployed state including: the vehicle floor weldment 12, ramp cover assembly 14, transition flap assembly 16, and ramp platform assembly 20.

The vehicle may be further modified to include a ramp assembly 10 which provides rolling access of a wheelchair from pavement (or ground surface) 236 into an interior 238 of the vehicle. The ramp assembly 10 is installed at the opening 230 usually in a generally rectangular ramp cavity (or recessed) area 13 in the floor weldment, as best shown in FIGS. 2-3. The ramp assembly 10 may include a ramp platform assembly 20 that is moveable between an interior 238 of the vehicle 200, where it may be stored below or generally flush with the floor 218 (a stowed position), and an exterior of the vehicle 200 for wheelchair access (in a deployed position) as shown in FIG. 1. The floor 218 may be defined by a top surface of a floor weldment 12, the top surface of ramp cover assembly 14, and/or other relevant surfaces of the vehicle.

In one embodiment, with the floor 218 being lowered from its original OEM position, the body or chassis 202 of the vehicle 200 may be raised by adding one or more spacers or other components at or near a front axle and a rear axle of the vehicle 200. The dropping of the floor 218 and raising of the body or chassis 202 may provide additional headroom in the interior 238 or cab of the vehicle 200 so that a wheelchaired passenger has more room to move about within the vehicle 200. Moreover, the additional headroom allows a wheelchaired passenger to enter or exit the vehicle 200 more easily. Notably, the amount of vehicle raise necessary to provide sufficient ground clearance usually correlates with the height (or thickness) of the ramp assembly 10, which sits below the floor 218. The thicker the ramp assembly 10, the greater the vehicle raise required to maintain the same headroom in the interior of the vehicle 200.

In known modified vehicles, such as the modified van 200, the middle row of seats may be removed from the manufacturer supplied vehicle to enable a passenger seating in a wheelchair to enter and exit the vehicle 200 using the ramp assembly 10. Once the wheelchaired passenger moves into the interior of the vehicle 200, the passenger or caregiver locates the wheelchair in the middle portion of the interior behind the driver and passenger seats of the front row. In other configurations, the wheelchaired passenger may be located in one of the front row seats.

Turning now to FIGS. 2-19, one embodiment of a ramp assembly 10 is shown, where the ramp assembly 10 accommodates a wheelchaired passenger entering or exiting a motorized vehicle 200. The ramp assembly may include a ramp platform assembly 20, a ramp carriage assembly 30, a ramp cover assembly 14, a transition flap assembly 16, and a roller bracket assembly 130. The ramp assembly 10 has two primary states of operation: a stowed state (FIGS. 2 and 4) and a deployed state (FIGS. 3 and 5).

The ramp platform assembly 20 may include a ramp platform 19 that is pivotally connected to the ramp carriage assembly 30, for example, via a hinge 50. In that respect, the ramp platform 19 may be oriented generally horizontally, or generally parallel to the floor 218 and ramp cover assembly 14, when disposed in its stowed position. In its deployed position, the ramp platform 19 may pivot relative to the ramp carriage assembly 30. In the deployed state, the ramp platform 19 can be pivoted downward relative to the ramp carriage assembly 30 to rest at ground level (FIGS. 3 and 5), whereby the ramp platform 19 will be positioned at an angle relative to ramp carriage assembly 20, the floor 218, and ramp cover assembly 14 to at least partially bridge the gap between the floor 218/ramp cover assembly 14 and the pavement 236, with an outboard edge of the ramp platform 19 contacting the pavement 236 and the inboard edge of the ramp platform 19 contacting the transition flap assembly 16.

Figure 8:
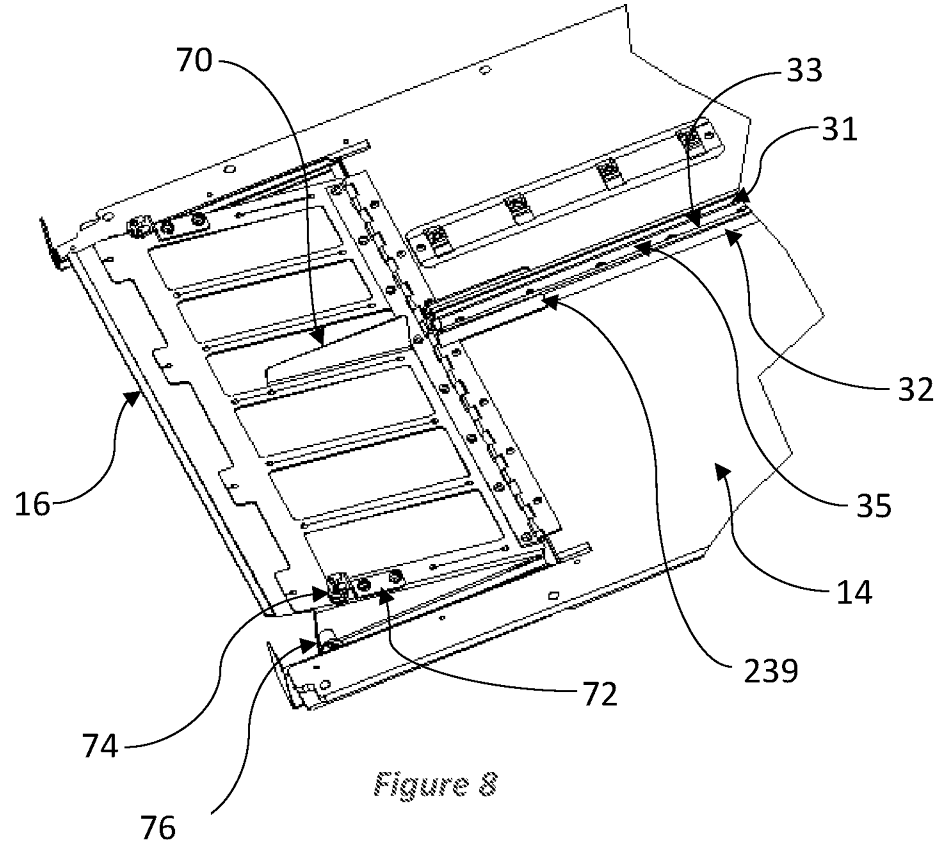
FIG. 8 is a detail perspective view of the underside of the ramp cover assembly 14 and transition flap assembly 16. The ramp platform lateral guide rollers 74, transition flap support (or lift) rollers 76, and carriage guide flange 70 are visible.

The ramp platform assembly 20 and/or ramp carriage assembly 30 may be attached to the vehicle through at least one guide rail 32 located above the ramp platform. The guide rail 32 may extend linearly from a point adjacent an inboard edge of the ramp assembly 10 to a point adjacent an outboard edge of the ramp assembly 10. Additionally, the guide rail 32 may be attached to the underside of the ramp cover assembly 14, as best shown in FIG. 8. The ramp cover assembly 14 in turn may include a ramp cover 15 with a flange region 17 at its periphery that connects the ramp cover assembly 14 to the floor weldment 12, whereby the ramp cover 15 is approximately flush with the top (floor) surface of the floor weldment 12 and the guide rail 32, ramp platform assembly 20, and carriage assembly 30 are disposed within the ramp cavity area 13 of the floor weldment 12. The ramp platform assembly 20 and ramp carriage assembly 30 are free to move longitudinally along the guide rail 32 between the stowed and deployed states. For this purpose, and as best shown in FIGS. 8 and 19, the guide rail 32 may define a generally C-shaped channel 35 with inwardly directed and opposing lips 31, 33 that receive and engage rollers 52 disposed on the ramp carriage assembly 30, although other shapes and configurations are possible and contemplated.

The ramp platform assembly 20 includes an edge guard (or side rail) 22 located at each lateral extremity of the ramp platform 19 and extending vertically upward. The edge guards may be fixed in the upright position or may fold downwardly or inwardly when the ramp platform assembly 20 is in its stowed state.

Figure 19:
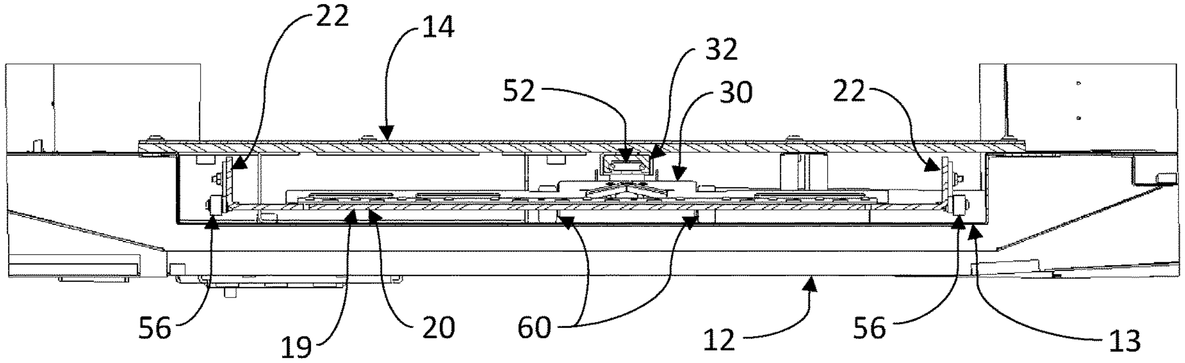
FIG. 19 is a cross-sectional view showing the relative positions of the ramp cover assembly 14, guide rail 32, and ramp platform assembly 20.

As best shown in FIG. 19, in one embodiment, at least a portion of the guide rail 32 is disposed within a space or void between the edge guards 22. In another embodiment, at least a portion of the guide rail 32 is disposed above the ramp platform 19 and below the floor 218 of the vehicle. In yet another embodiment, at least a portion of the guide rail 32 is disposed above the ramp platform 19 and below the ramp cover 15. In yet another embodiment, at least a portion of the guide rail is disposed above the ramp platform 19 and below the top surfaces 110 of the edge guards 22.

When the ramp platform assembly 20 is fully extended from the vehicle, the transition flap assembly 16 may bridge any longitudinal or vertical gaps between the ramp platform 19 and ramp cover assembly 14. As best shown in FIGS. 8, 9, and 12-14, the transition flap assembly 16 may be pivotally connected at one of its longitudinal extremities to the ramp cover assembly 14 and may be supported vertically near its opposite longitudinal extremity by the ramp platform edge guards 22 through either support rollers 76 or wear pads attached to the transition flap assembly 16. The edge guards 22 may include shaped cam segments 21, 23 at each of their longitudinal extremities that act as cams in order to control the up and down, vertical displacement of the transition flap assembly 16. When the ramp platform assembly 20 is in a fully deployed (see, e.g., FIG. 12) or fully stowed state (see, e.g., FIG. 14), the cam segments 21, 23 allow for the transition flap support rollers 76 to drop vertically downward, resulting in a lowering of the outboard longitudinal extremity 114 of the transition flap assembly 16 until it rests on or approximately on the top of the ramp platform 19. One embodiment of the cam segment 23 includes a cam profile that follows a profile 112, which may be curved as shown or linear, to ensure approximate contact between the outer longitudinal extremity 114 of the transition flap assembly 16 with the ramp platform assembly 20 over a range of deployed ramp platform angles. Other embodiments of the invention could include various cam profile geometries. As the ramp platform assembly 20 is moved longitudinally out of the deployed state and into the vehicle (see, e.g., FIG. 13), the transition flap support roller 76 is forced vertically upward until it rides on the top edge 110 of the ramp platform edge guard 22. As the support roller 76 is lifted, so too is the outer longitudinal extremity 114 of the transition flap. This position of the transition flap assembly 16 provides vertical clearance to the top of the ramp platform assembly 20 during transition between the deployed and stowed ramp assembly states. As shown, the top edge 110 of the edge guard 22 between the cam segments 21, 23 is linear and generally parallel with the ramp platform 19, but need not be. Indeed, the top edge 110 may have a certain profile that adjusts the relative position of the transition flap assembly 16 and ramp platform assembly 20 when the ramp platform assembly 20 is in a transitional position between the deployed and stowed positions.

Figure 7:
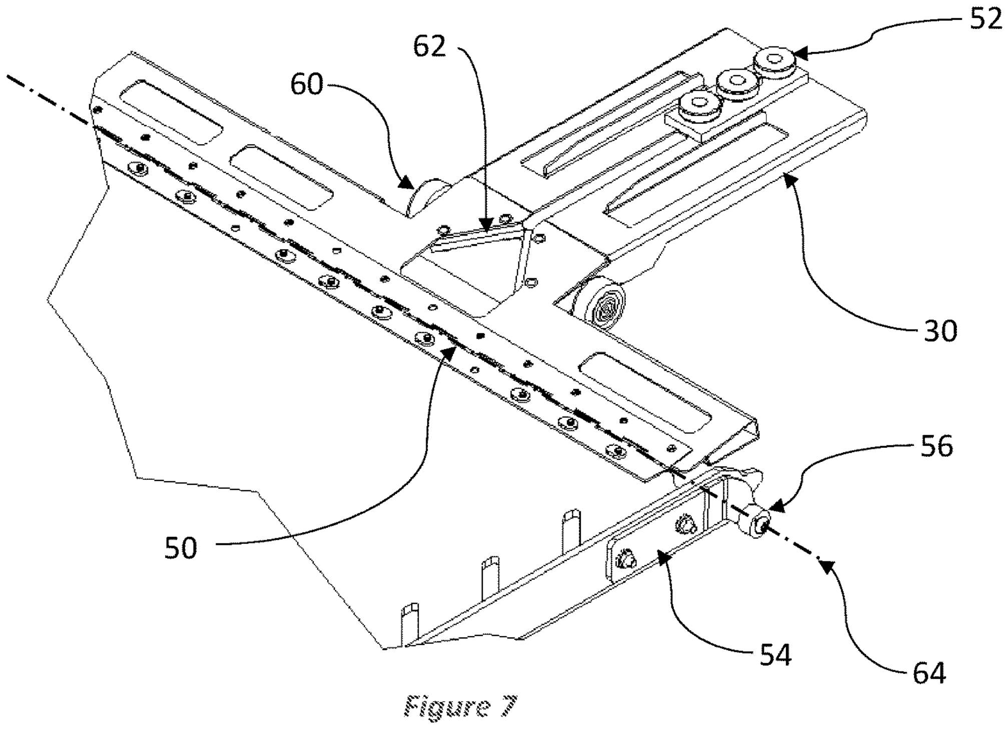
FIG. 7 is a detail perspective view of the ramp carriage assembly 30 and attached components.
Figure 18:
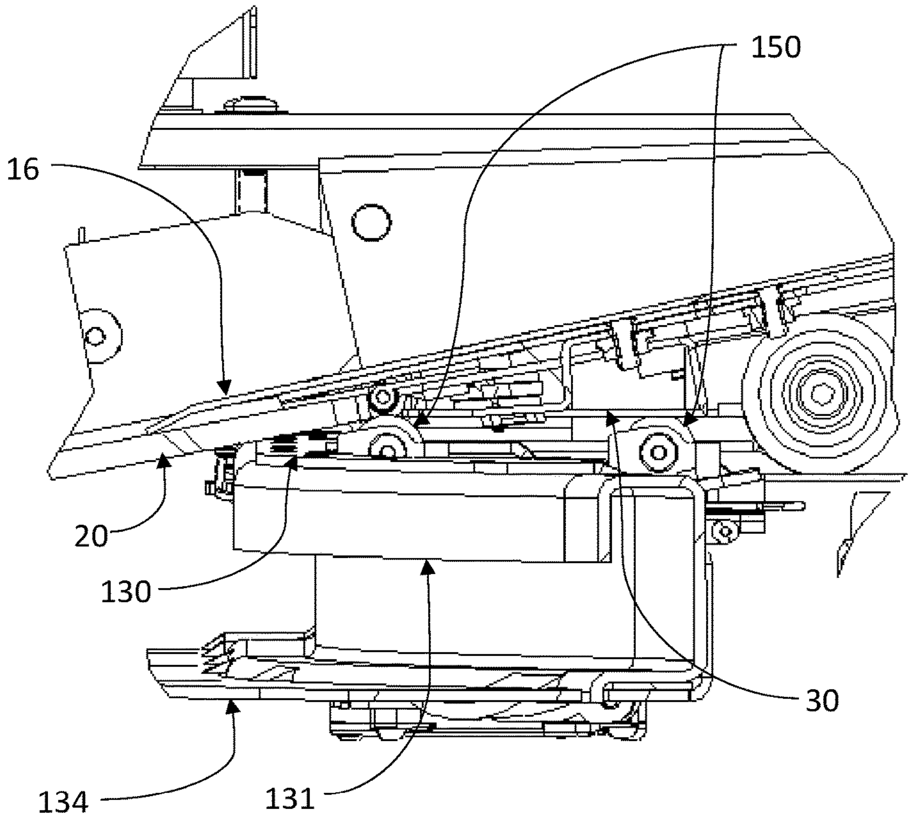
FIG. 18 is a partially sectioned side view of the interface between the ramp platform assembly 20, ramp carriage 30, sliding door track 131 and roller bracket assembly 130.

In one embodiment, the guide rail 32 limits one or both of lateral and vertical displacement of the ramp platform assembly 20 and ramp carriage assembly 30. As best shown in FIGS. 7 and 18, supplemental vertical restraint may be achieved by supporting the ramp carriage assembly 30 on the bottom surface 25 of the ramp cavity area in the floor weldment 12 through rollers 60 or wear pads attached to the ramp carriage assembly 30.

Figure 9:
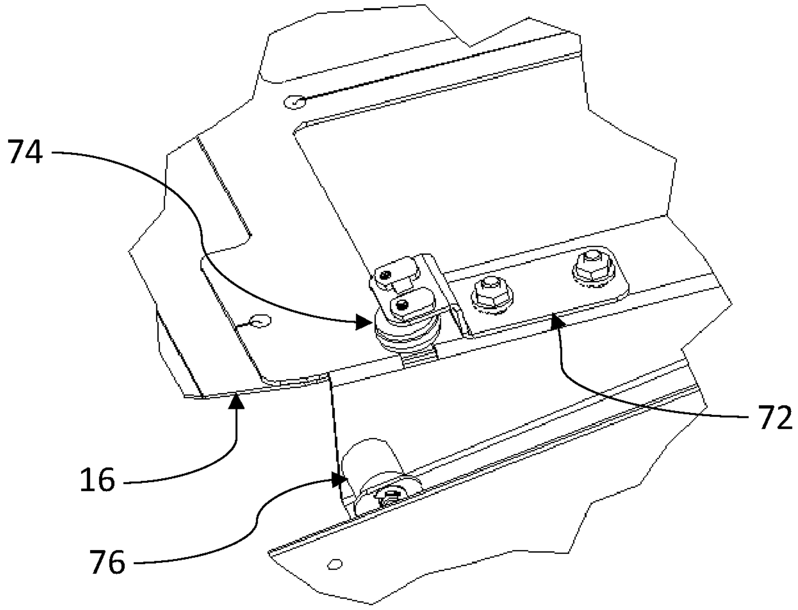
FIG. 9 is a detail perspective view of the underside of the transition flap assembly 16. One transition flap support roller 76 and one lateral guide roller 74 are shown.
Figure 11:
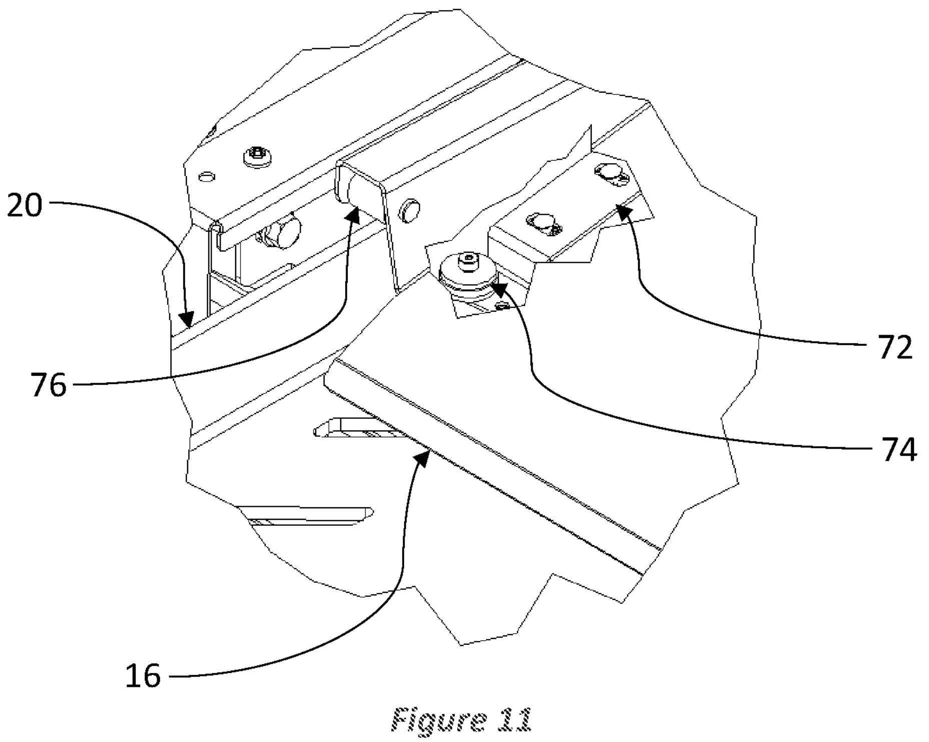
FIG. 11 is a cutaway view showing one of the lateral guide rollers 74 interfacing with the edge guards 22 of the ramp platform assembly 20. Also shown is one transition flap support roller 76 interfacing with the top of the edge guard 22.

In another embodiment, as best shown in FIGS. 9 and 11, supplemental lateral restraint may be achieved by guiding the inside vertical surfaces of the ramp platform edge guards 22 along the transition flap assembly 16 through either rollers 74 or wear pads attached to the transition flap assembly 16. The rollers 74 may be mounted to the transition flap assembly via bracket 72. In alternative embodiments, the rollers 74 may be disposed on the edge guards 22 for engagement with corresponding faces of the transition flap assembly 16 and/or vertical surfaces of the track pan area 11 of the floor weldment 12. In yet additional embodiments, the rollers 74 may be disposed on vertical surfaces of the track pan area 11 of the floor weldment 12 for engagement with outside vertical surfaces of the ramp platform edge guards 22.

Figure 10:
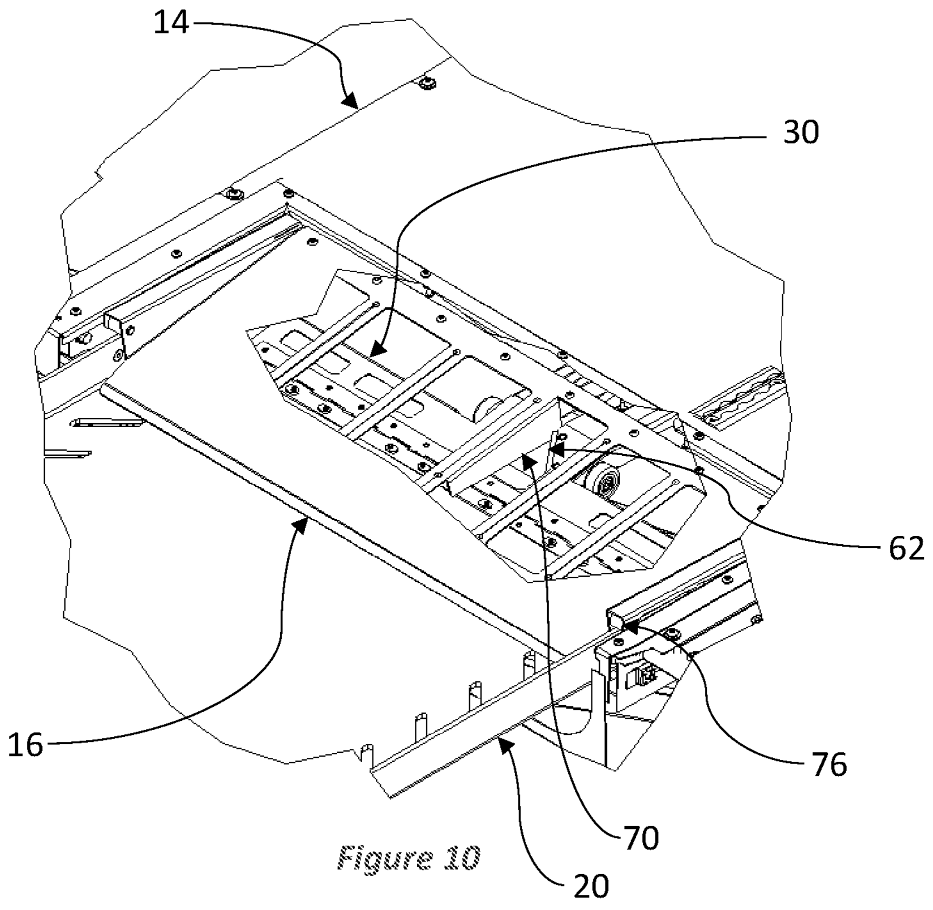
FIG. 10 is a cutaway perspective view showing the ramp carriage assembly 30 interfacing with the guide flange 70 on the underside of the transition flap assembly 16 (near full ramp deployment. Also shown are both transition flap support rollers 76 in-position on top of the ramp edge guards 22.

In another embodiment, as best shown in FIGS. 7, 8 and 10, supplemental lateral restraint for the fully deployed ramp assembly may be achieved by engagement between the ramp carriage assembly 30 and the transition flap assembly 16. For example, the ramp carriage assembly 30 may include wear pads 62 or rollers, such as the two wear pads 62 shown that are oriented at converging angles, while the transition flap assembly 16 may include a downwardly directed and longitudinally oriented guide flange 70. As shown, the guide flange 70 is received between and may engage with the wear pads 62 to keep the carriage assembly 30 properly centered and in alignment with the guide rail 32. In alternative embodiments, the carriage assembly 30 may include the flange 70 and the transition flap assembly 16 may include the wear pads 62 or rollers.

Figure 12:
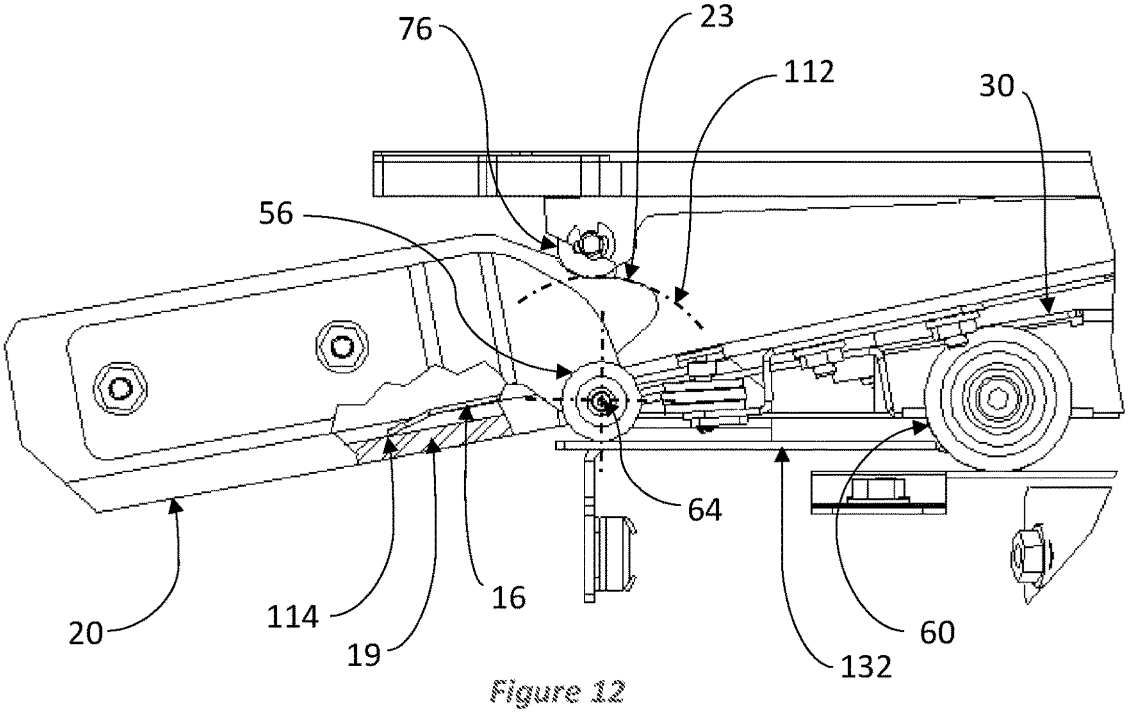
FIG. 12 is a cutaway side view of the ramp assembly 10 in its fully deployed state. This figure shows the relative positions of the transition flap assembly 16 and transition flap support roller 76 in the deployed state.

As best shown in FIGS. 15-18, a roller bracket assembly 130 is attached to the vehicle floor structure 12 and is located directly beneath the ramp platform assembly 20. For a vehicle 200 with a sliding door 214, the roller bracket assembly 130 may be attached directly to the top of the vehicle's sliding door track 131. In this embodiment, the sliding door track 131 may be connected to the floor structure 12 in manner that makes the sliding door track 131 a structural element of the vehicle floor. For instance, the door track 131 may be oriented vertically, whereby the door track 131 is attached to the vehicle floor structure 12 at its lower extremity through a base plate 134 and at its upper extremity to the roller bracket 130, bridge plate 132, and bridge plate 135. The roller bracket 130 in turn is attached to the bottom/horizontal surface of the track pan area 11 of the vehicle floor structure 12 via one or more flanges 152. The roller bracket 130 may additionally be attached to the vehicle floor structure 12 approximate the top edge of track pan area 11 through a bridge plate 133, wherein the bridge plate 133 may be oriented generally horizontally. Similarly, one or both of bridge plates 132, 135 may be oriented generally horizontally and interconnect the door track 131 to the vehicle floor structure 12 approximate the top edge of track pan area 11. Bridge plate 133 may include flange 136 for connection to the vehicle floor structure, while bridge plate 135 may include flange 137 for connection to the vehicle floor structure 12 and flange 138 for connection to the B-pillar of the vehicle. In that respect, the door track 131, base plate 130, roller bracket 130, and one or more of bridge plates 132, 133, 135 define a generally L-shaped reinforcement bracket that, when combined with the bottom/horizontal surface and side/vertical wall of the track pan area 11, further define a box structure that reinforces the strength of the vehicle floor structure 12 in the region of track pan area 11. The top surface of bridge plate 133 may also provides a support surface for at least one of the wheels 60 of the carriage assembly 30 when the platform assembly 20 is in the deployed position, as best shown in FIG. 12.

Figure 13:
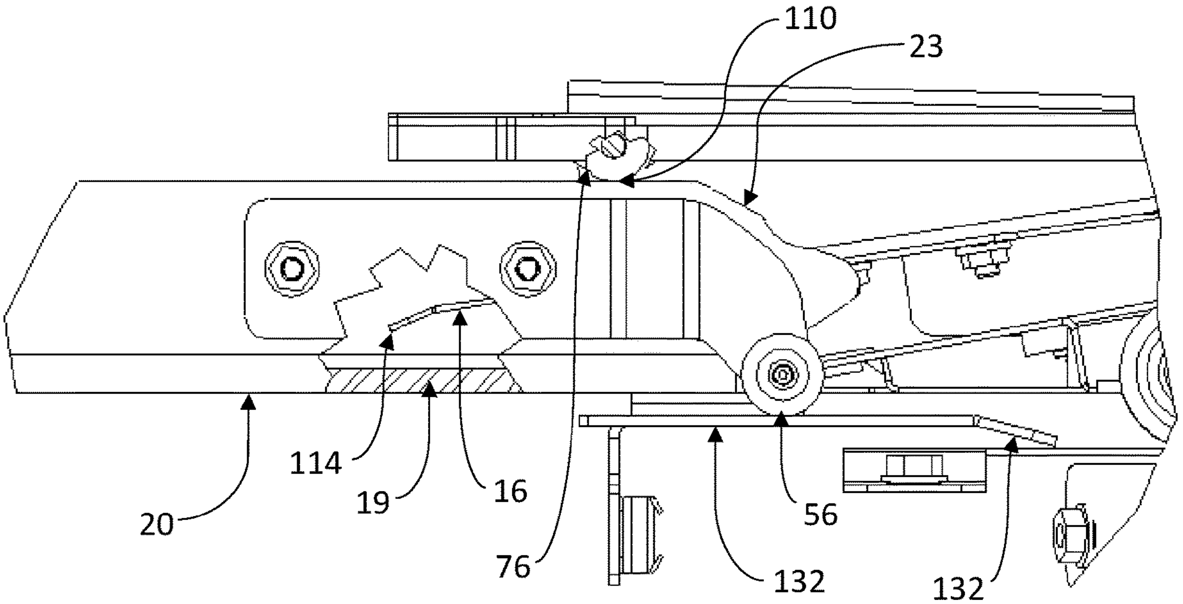
FIG. 13 is a cutaway side view of the ramp assembly 10 in a transitional state between the stowed and deployed states. This figure shows the relative positions of the transition flap assembly 16 and transition flap support roller 76 in the transition state.
Figure 17:
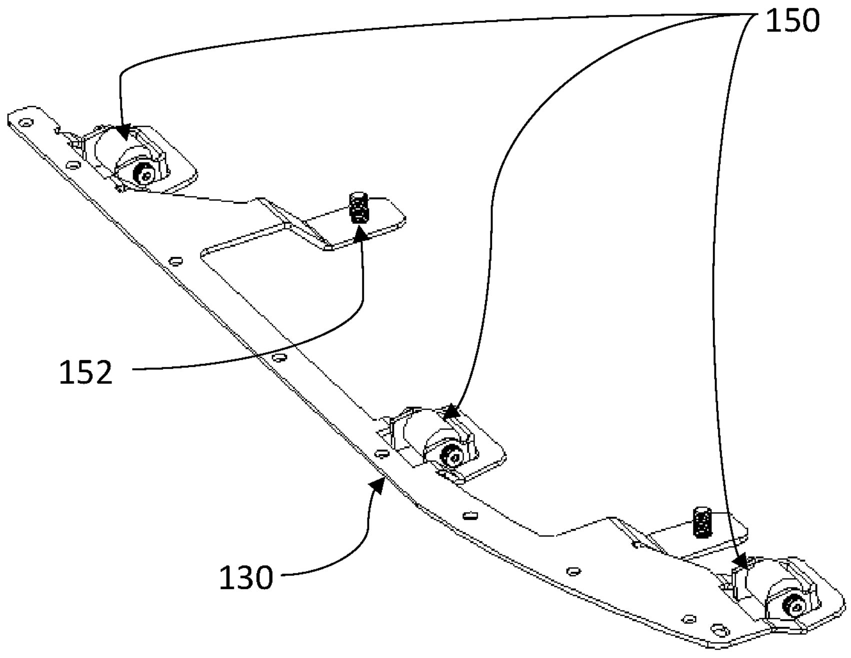
FIG. 17 is a perspective view of the roller bracket assembly 130 in isolation.

As best shown in FIGS. 17-18, the roller bracket assembly 130 includes one or more rollers 150 which support the ramp platform assembly 20 as it is moved longitudinally into or out of the vehicle. When the ramp platform assembly 20 is fully deployed (FIG. 18), at least some of the rollers 150 provide support for the ramp platform assembly 20 and/or carriage assembly 30 as they are loaded by the weight of a wheelchair and wheelchaired passenger. Additional support for the ramp platform assembly 20 may be achieved by direct support from the vehicle floor structure 12 or through components mounted to the vehicle floor structure 12. For instance, in one embodiment, the ramp platform assembly 20 may be provided with rollers 56 mounted to brackets 54 attached to the outside vertical surfaces of the edge guards 22, whereby the rollers 56 ride along the bottom surface of the ramp cavity area 13 as the ramp platform assembly is in the stowed and transitional positions. As the ramp platform approaches is fully deployed position, the rollers 56 may ride upon and be supported by the top surfaces of brackets 132, 135, as best shown in FIGS. 12-13. The rollers 56 may be located along axis 64, whereby the rollers are coaxial with the hinge 50 between the ramp platform assembly 20 and ramp carriage assembly 30 to allow for unimpeded pivoting of the ramp platform to ground level.

In some embodiments, the ramp assembly 10 may include a motor that is interconnected to one or both of the carriage assembly 30 and the platform assembly 20 to move the platform assembly between its stowed and deployed positions. In other embodiments, the ramp assembly 10 may include a handle or other gripping member 59 that may be gripped by the vehicle operator to manually move the platform assembly 20 between its stowed and deployed positions. As shown, the handle 59 may take form of a pole affixed to the platform assembly 20 and/or edge guard 22 via a bracket 58. In other embodiments, the handle 59 may be mounted in other ways to the platform assembly 20 and/or take other forms, including a slot integrated into the platform assembly.

Figure 4:
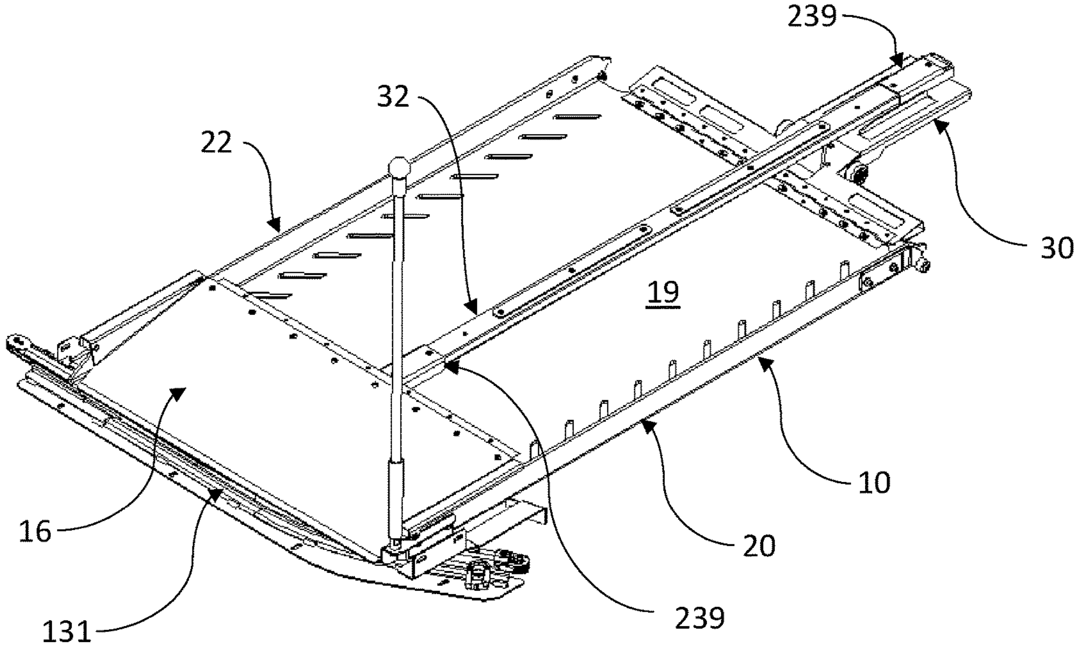
FIG. 4 is a perspective view of the in-floor ramp assembly 10 its stowed state with the vehicle floor weldment 12 and ramp cover assembly 14 hidden. The ramp platform assembly 20, transition flap assembly 16, ramp carriage assembly 30, linear guide rail 32 and sliding door track 131 are all visible.
Figure 5:
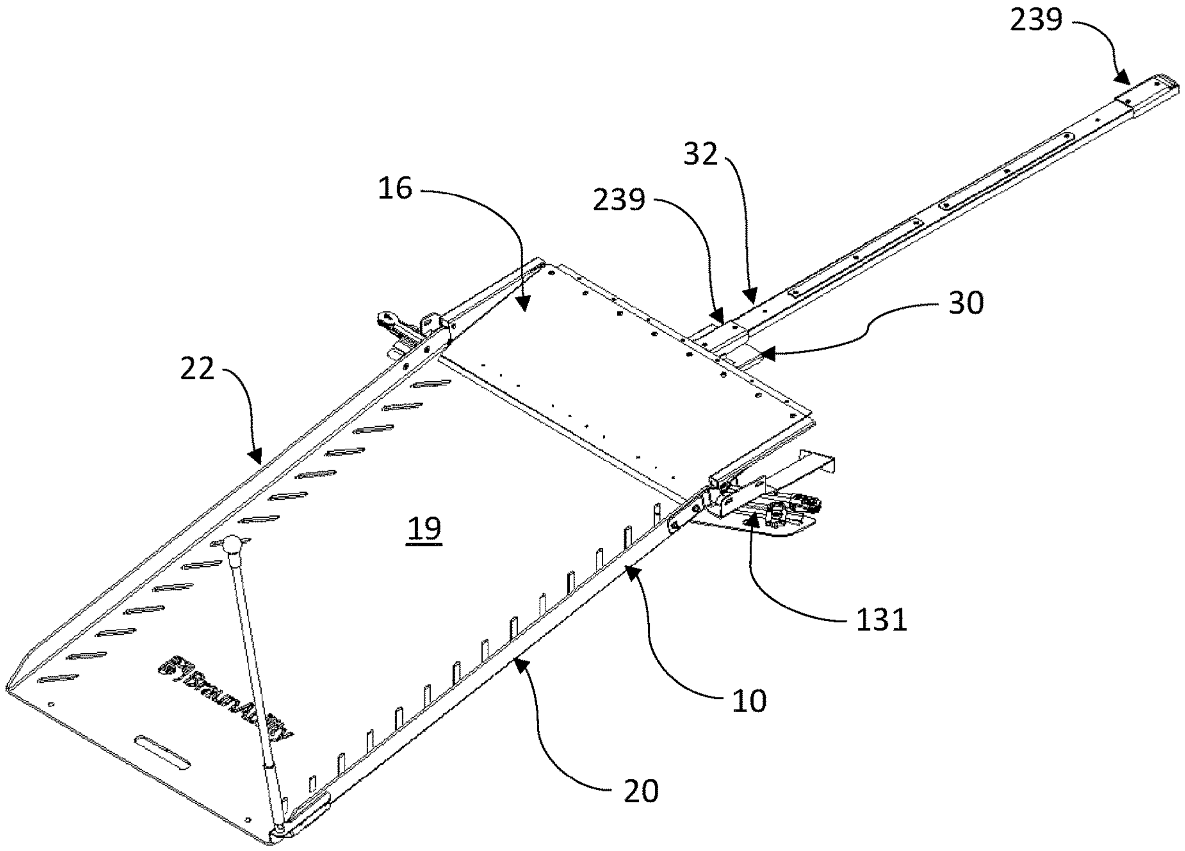
FIG. 5 is a perspective view of the in-floor ramp assembly 10 in its fully deployed state with the vehicle floor weldment and ramp cover assembly 14 hidden. The ramp platform assembly 20, transition flap assembly 16, ramp carriage assembly 30, guide rail 32, and sliding door track 131 are all visible.
Figure 6:
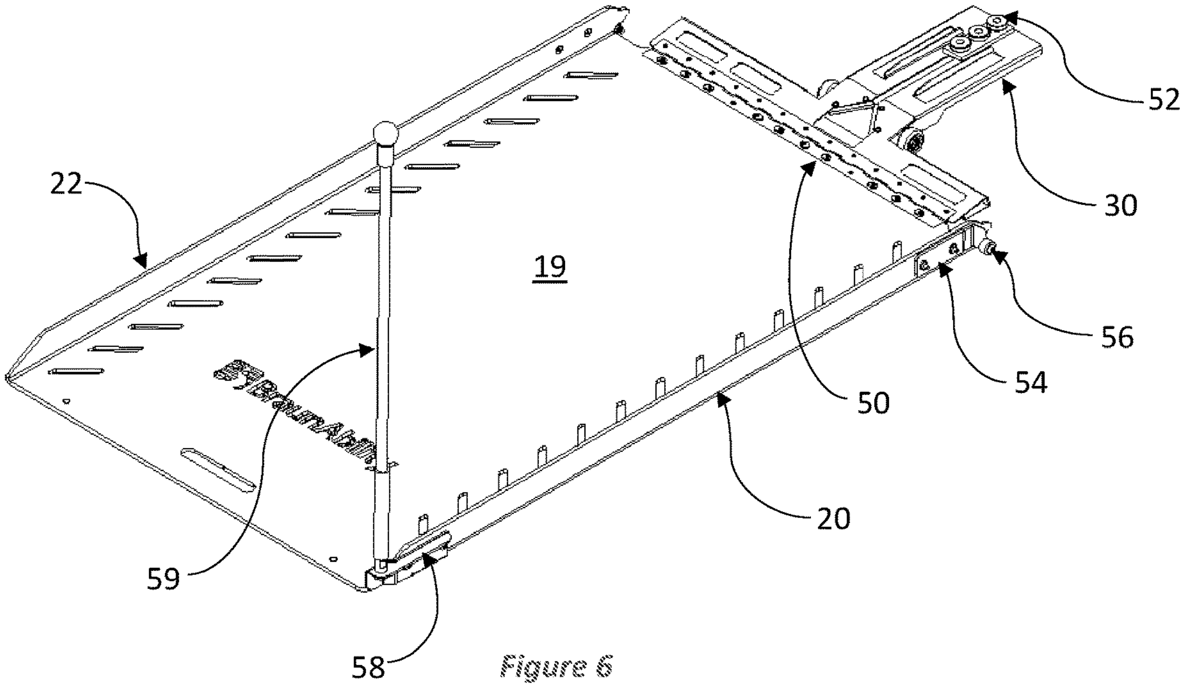
FIG. 6 is a perspective view of the ramp platform assembly 20 and ramp carriage assembly 30 in isolation.
Figure 20:
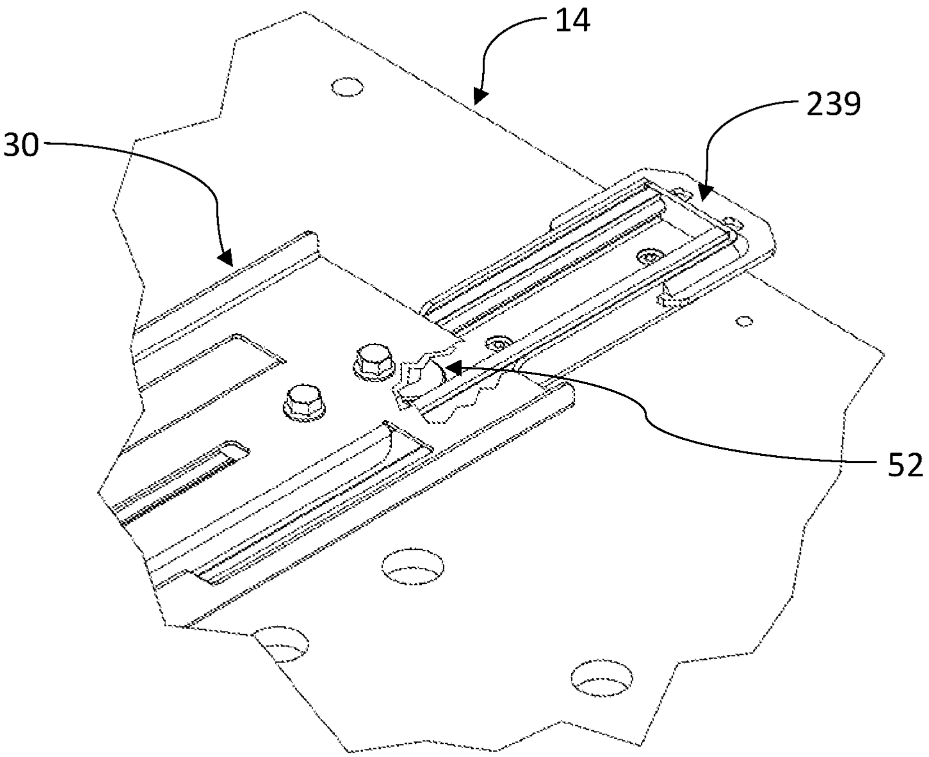
FIG. 20 is a close up perspective view showing the underside of the rigid end stop 239 for the linear guide rail 32.

As best seen in FIGS. 4, 8 and 20, the moving platform and carriage assemblies 20, 30 impact rigid end stops 239 located at opposite ends of the linear guide rail 32 as the platform and carriage assemblies 20, 30 reach their stowed and deployed positions. The rigid end stop configuration decelerates the platform and carriage assemblies 20, 30 abruptly and therefore has the potential to wear parts more rapidly or, depending on the severity that the ramp is actuated, yield components of the ramp assembly 10. To prevent premature wear or damage, the ramp assembly 10 may include enhanced end-stops at either end of the linear guide rail 32, as shown in FIGS. 21-23, that are designed to dampen the impact and absorb energy from the moving platform and carriage assemblies 20, 30.

Figure 21:
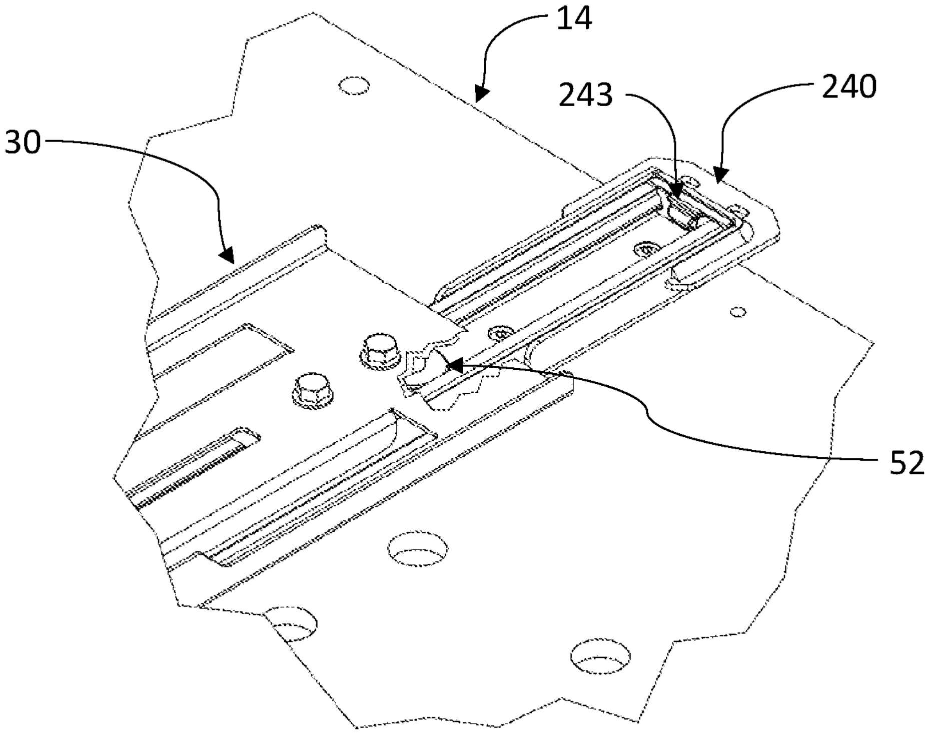
FIG. 21 is a close up perspective view showing the underside of a first embodiment of an enhanced end stop 241.

In one embodiment seen in FIG. 21, the enhanced end stop comprises a bumper 243 made of viscoelastic material that lines the inside surface of a rigid end stop 240 where the ramp carriage assembly 30 will make contact. The viscoelastic bumper 243 absorbs a portion of the impact energy from the ramp and carriage assemblies 20, 30.

Figure 22:
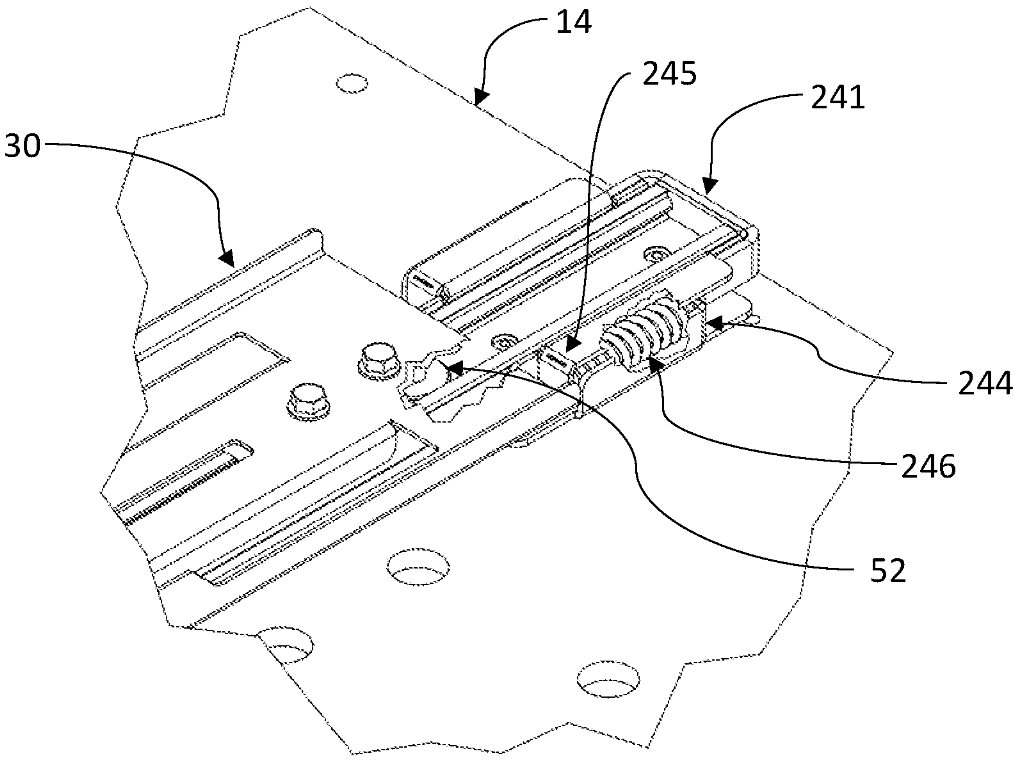
FIG. 22 is a close up perspective view showing the underside of a second embodiment of an enhanced end stop 242.

In another embodiment seen in FIG. 22, the enhanced end stop 241 is comprised of both a fixed member 244 and sliding member 245. The sliding member 245 is free to slide in the direction of ramp travel but is impeded by one or more energy absorbing members 246 placed between the fixed and sliding members 244, 245. The energy absorbing member 246 may comprise, for example, coil springs, viscoelastic springs, viscoelastic bumpers, dashpots or a combination thereof. In its unloaded state, the sliding member 245 is in a position corresponding to the desired ramp stopping position. When the ramp carriage assembly 30 contacts the sliding member 245 the energy absorbing member 246 is compressed, allowing the sliding member 245 to over-travel before returning to the desired ramp carriage stopping position. The over-travel of the sliding member 245 allows the ramp and carriage assemblies 20, 30 to be decelerated over a measurable distance, resulting in a reduction in peak impact force.

Figure 23:
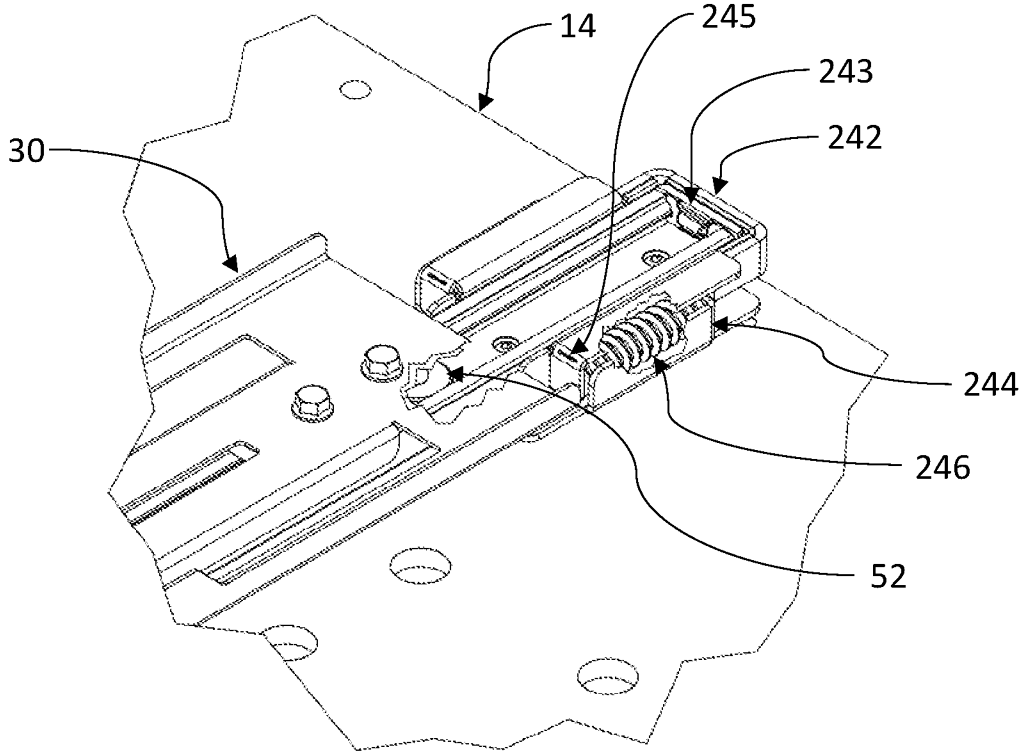
FIG. 23 is a close up perspective view showing the underside of a third embodiment of an enhanced end stop 243.

In yet another embodiment seen in FIG. 23, the enhanced end stop 242 is a combination of the first two embodiments described above. This embodiment is comprised of both a fixed member 244 and sliding member 245. The inside surface of the sliding member 245 is lined with a bumper 243 made of viscoelastic material. The sliding member 245 and bumper 243 are free to slide in the direction of ramp travel but are impeded by one or more energy absorbing members 246 placed between the fixed and sliding members 244, 245. The energy absorbing member 246 may, for example, comprise coil springs, viscoelastic springs, viscoelastic bumpers, dashpots or a combination thereof. The bumper 243 and energy absorbing members 246 work together to absorb the kinetic energy of the platform and carriage assemblies 20, 30 by allowing them to be decelerated over a measurable distance.

While the figures show that the enhanced end stops of FIGS. 21-23 are secured to the guide rail, a stationary portion of the ramp assembly, it is contemplated that the enhanced end stops could instead be secured to a movable portion of the ramp assembly, such as the carriage assembly 30 or the platform assembly 20.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A ramp assembly to accommodate a wheelchaired passenger to enter or exit a passenger vehicle, the ramp assembly comprising a ramp cover and a guide rail configured to guide a ramp platform assembly between a stowed position and a deployed position, wherein:

the ramp platform assembly comprises a ramp platform, a first edge guard approximate a first lateral extremity of the ramp platform assembly, and a second edge guard approximate a second lateral extremity of the ramp platform assembly; and, at least a portion of the guide rail is disposed above the ramp platform and the guide rail is fixed to an underside of the ramp cover.

2. The ramp assembly of claim 1, wherein the guide rail consists essentially of a single centrally disposed rail.

3. The ramp assembly of claim 1, wherein, when the ramp platform assembly is in its stowed position, the guide rail is disposed between the first edge guard and the second edge guard.

4. The ramp assembly of claim 3, wherein, when the ramp platform assembly is in its stowed position, at least a portion of the guide rail is disposed below a top edge of the first edge guard and a top edge of the second edge guard.

5. The ramp assembly of claim 3, wherein the first edge guard and the second edge guard extend upwardly from the ramp platform at least when the ramp platform assembly is in its deployed position.

6. The ramp assembly of claim 5, wherein the first edge guard and the second edge guard extend upwardly from the ramp platform when the ramp platform assembly is in its stowed position.

7. The ramp assembly of claim 6, wherein, when the ramp platform assembly is in its stowed position, at least a portion of the guide rail is disposed below a top edge of the first edge guard and a top edge of the second edge guard.

8. The ramp assembly of claim 7, wherein the guide rail consists essentially of a single centrally disposed rail.

9. The ramp assembly of claim 1 further comprising a carriage assembly, wherein: the ramp platform assembly is hingedly connected to the carriage assembly whereby the ramp platform assembly can pivot downwardly from the carriage assembly in the deployed position; and, the carriage assembly engages with the guide rail to move the ramp platform assembly between its stowed position and deployed position.

10. The ramp assembly of claim 9, wherein the guide rail comprises a C-shape with a pair of inwardly directed lips that define a channel; and the carriage assembly includes at least one roller wheel configured to move longitudinally in the channel.

11. The ramp assembly of claim 9 further comprising a transition flap assembly at least partially overlying the carriage assembly at least when the ramp platform assembly is in the deployed position, the transition flap assembly engaging with the carriage assembly as the ramp platform assembly approaches the deployed position to keep the carriage assembly approximately aligned with the guide rail.

12. The ramp assembly of claim 1 further comprising a transition flap assembly overlying the ramp platform assembly at least when the ramp platform assembly is disposed in a plurality of transitional positions between the stowed position and the deployed position, wherein the transition flap assembly includes a first guide member configured to engage the first edge guard and a second guide member configured to engage the second edge guard and thereby limit a lateral movement of the ramp platform assembly when the ramp platform assembly is in the transitional positions.

13. The ramp assembly of claim 1 further comprising a transition flap assembly overlying the ramp platform assembly at least when the ramp platform assembly is disposed in a plurality of transitional positions between the stowed position and the deployed position, wherein the transition flap is coupled to the ramp platform assembly via a cam mechanism to maintain a spaced relationship between the transition flap assembly and the ramp platform assembly when the ramp platform assembly is in the transitional positions.

14. The ramp assembly of claim 12, wherein the cam mechanism is configured to move an outboard longitudinal extremity of the transition flap assembly into at least approximate contact with the ramp platform as the ramp platform assembly approaches the deployed position.

15. The ramp assembly of claim 13, wherein the cam mechanism is configured to move the outboard longitudinal extremity of the transition flap assembly into at least approximate contact with the ramp platform as the ramp platform assembly approaches the stowed position.

16. A ramp assembly to accommodate a wheelchaired passenger to enter or exit a passenger vehicle, the ramp assembly comprising a guide rail configured to guide a ramp platform assembly between a stowed position and a deployed position, wherein:

the guide rail is configured to be fixed stationary relative to the passenger vehicle;

the ramp platform assembly comprises a ramp platform, a first edge guard approximate a first lateral extremity of the ramp platform assembly, and a second edge guard approximate a second lateral extremity of the ramp platform assembly; and, at least a portion of the guide rail is disposed above the ramp platform when the ramp platform assembly is in the stowed position.

17. The ramp assembly of claim 16, wherein, when the ramp platform assembly is in its stowed position:

at least a portion of the guide rail is disposed below a top edge of the first edge guard and a top edge of the second edge guard; and, the first edge guard and the second edge guard extend upwardly from the ramp platform.

18. A ramp assembly to accommodate a wheelchaired passenger to enter or exit a passenger vehicle, the ramp assembly comprising a guide rail configured to guide a ramp platform assembly between a stowed position and a deployed position, wherein:

the ramp platform assembly comprises a ramp platform, a first edge guard approximate a first lateral extremity of the ramp platform assembly, and a second edge guard approximate a second lateral extremity of the ramp platform assembly;

wherein the ramp platform assembly is configured to move along a length of, and relative to the guide rail between a stowed position and a deployed position; and, at least a portion of the guide rail is disposed above the ramp platform when the ramp platform is in the stowed position.

19. The ramp assembly of claim 18, wherein, when the ramp platform assembly is in its stowed position:

at least a portion of the guide rail is disposed below a top edge of the first edge guard and a top edge of the second edge guard; and, the first edge guard and the second edge guard extend upwardly from the ramp platform.

20. The ramp assembly of claim 18, wherein the guide rail is configured to be fixed relative to the passenger vehicle.

* * * * *